(12) United States Patent
Kim et al.

(10) Patent No.: US 11,935,173 B2
(45) Date of Patent: Mar. 19, 2024

(54) PROVIDING METHOD AND DEVICE OF INTERACTIVE VIRTUAL REALITY CONTENTS

(71) Applicants: VISION VR INC., Seoul (KR); Dong Kyu Kim, Anyang-si (KR); Sung Choi, Seongnam-si (KR); Won-Il Kim, Gwacheon-si (KR)

(72) Inventors: Dong Kyu Kim, Anyang-si (KR); Won-Il Kim, Gwacheon-si (KR)

(73) Assignees: VISION VR INC., Seoul (KR); Dong Kyu Kim, Anyang-si (KR); Sung Choi, Seongnam-si (KR); Won-Il Kim, Gwacheon-si (KR)

( * ) Notice: Subject to any disclaimer, the term of this patent is extended or adjusted under 35 U.S.C. 154(b) by 0 days.

(21) Appl. No.: 18/150,138

(22) Filed: Jan. 4, 2023

(65) Prior Publication Data
US 2023/0144035 A1 May 11, 2023

Related U.S. Application Data

(63) Continuation of application No. 17/235,301, filed on Apr. 20, 2021, now Pat. No. 11,605,196.

(51) Int. Cl.
*G06T 13/80* (2011.01)
*G06F 3/0482* (2013.01)
*G06T 13/40* (2011.01)

(52) U.S. Cl.
CPC ............ *G06T 13/80* (2013.01); *G06F 3/0482* (2013.01); *G06T 13/40* (2013.01); *G06T 2200/24* (2013.01)

(58) Field of Classification Search
CPC ..... G06T 13/80; G06T 13/40; G06T 2200/24; G06F 3/0482
See application file for complete search history.

(56) References Cited

U.S. PATENT DOCUMENTS

2007/0165022 A1  7/2007  Peleg et al.
2012/0299934 A1  11/2012  Perlin
(Continued)

FOREIGN PATENT DOCUMENTS

JP           2002-200356 A    7/2002
KR    10-2011-0074191 A    6/2011
(Continued)

OTHER PUBLICATIONS

Office Action issued in KR 10-2020-0020833; mailed by the Korean Intellectual Property Office dated Jan. 25, 2021.
(Continued)

*Primary Examiner* — Michelle Chin
(74) *Attorney, Agent, or Firm* — Studebaker & Brackett PC

(57) ABSTRACT

Provided are a method and device for providing interactive virtual reality content capable of increasing user immersion by naturally connecting an idle image to a branched image. The method includes providing an idle image including options, wherein an actor in the idle image performs a standby operation, while the actor performs the standby operation, receiving a user selection for an option, providing a connection image, and providing a corresponding branched image according to the selection of the user, wherein a portion of the actor in the connection image is processed by computer graphics, and the actor performs a connection operation so that a first posture of the actor at a time point at which the selection is received is smoothly connected to a second posture of the actor at a start time point of the branched image.

11 Claims, 13 Drawing Sheets

(56) References Cited

U.S. PATENT DOCUMENTS

| | | | |
|---|---|---|---|
| 2013/0336528 A1* | 12/2013 | Itani | G06V 40/107 |
| | | | 382/103 |
| 2015/0030236 A1 | 1/2015 | Wilson et al. | |
| 2015/0092981 A1 | 4/2015 | Kim et al. | |
| 2017/0351373 A1* | 12/2017 | Ueno | G06F 3/04845 |
| 2019/0236341 A1 | 8/2019 | Nallapa et al. | |
| 2020/0211406 A1 | 7/2020 | Kokku et al. | |

FOREIGN PATENT DOCUMENTS

| | | |
|---|---|---|
| KR | 10-2018-0101047 A | 9/2018 |
| KR | 10-2020-0008706 A | 1/2020 |

OTHER PUBLICATIONS

"Decision to Grant" Office Action issued in KR 10-2020-0020833; mailed by the Korean Intellectual Property Office dated Mar. 17, 2021.

* cited by examiner

PROVIDING METHOD AND DEVICE OF INTERACTIVE VIRTUAL REALITY CONTENTS

This application is a Continuation of U.S. patent application Ser. No. 17/235,301, filed on Apr. 20, 2021, which claims priority from Korean Patent Application No. 10-2020-0020833 filed on Feb. 20, 2020, in the Korean Intellectual Property Office, the disclosure of which is incorporated herein by reference in its entirety.

BACKGROUND

1. Field of the Disclosure

The present disclosure relates to a method and device for providing interactive virtual reality content.

2. Description of the Related Art

Virtual reality content makes a specific environment/situation, which is similar to the real thing but is not real, through a computer and makes users feel as if they are interacting with a real situation/environment.

Further, interactive content enables users to actively participate in a process of story progression of content (e.g., movies, games, books, etc.). Therefore, even when the users experience one interactive content, multiple users may have multiple different endings.

SUMMARY

Virtual reality content and interactive content are similar in that users do not passively experience the content but actually play the content. Therefore, virtual reality content (hereinafter, referred to as "interactive virtual reality content") to which an interactive function is added is being discussed.

Meanwhile, while providing interactive virtual reality content (e.g., while screening a video), it is possible to stop the progress of the content, provide a plurality of options to a user, and provide a branched image corresponding to the selection of the user. However, when the connectivity between an image (hereinafter, referred to as an "idle image") providing the plurality of options and a branched image following the idle image is degraded, the immersion of the user (i.e., audience) in the interactive virtual reality content is lowered.

Aspects of the present disclosure provide a method and device for providing interactive virtual reality content capable of increasing user immersion by naturally connecting an idle image to a branched image.

One aspect of the present disclosure provides a method of providing interactive virtual reality content, which is performed by a computing device, the method includes providing an idle image including options, wherein an actor in the idle image performs a standby operation, while the actor performs the standby operation, receiving, from a user, a selection for a corresponding one of the options, after the receiving of the selection, providing a connection image, and after the providing of the connection image, providing a corresponding branched image according to the selection of the user, wherein at least a portion of the actor in the connection image is processed by computer graphics, and the actor performs a connection operation so that a first posture of the actor at a time point at which the selection is received is smoothly connected to a second posture of the actor at a start time point of the branched image.

The actor in the idle image may move from a first standby posture to a second standby posture.

The method may further include storing a plurality of connection images, wherein the plurality of connection images may include a first connection image including the actor moving from the first standby posture to the second posture and a second connection image including the actor moving from the second standby posture to the second posture.

The method may further include checking the first posture of the actor at the time point at which the selection is received, wherein the providing of the connection image may include selectively providing the first connection image or the second connection image according to the checked first posture.

The checking of the first posture of the actor may include checking the first posture of the actor by using a first time stamp when the actor in the idle image is in the first standby posture, a time interval between the first standby posture and the second standby posture, and a second time stamp at the time point at which the selection is received.

The actor in the idle image may move from a first standby posture to a second standby posture and then return to the first standby posture from the second standby posture. Even when the posture of the actor in the idle image is more similar to the second standby posture than the first standby posture at the time point at which the selection is received, the actor in the idle image may return to the first standby posture. After the returning to the first standby posture, the connection image may be provided.

The connection image may include clothes in the first standby posture of the actor being dissolved into clothes in the second posture of the actor.

The method may further include checking characteristics of movement of the actor in a start section of the branched image, wherein a region of the clothes in the first standby posture of the actor, in which the dissolving is first applied, may be changed according to the characteristics of the movement.

Another aspect of the present disclosure provides a device for providing interactive virtual reality content, the device includes a memory, and a processor, wherein the memory includes instructions causing the processor to execute the operations of providing an idle image including options, wherein an actor in the idle image performs a standby operation in which the actor moves from a first standby posture to a second standby posture, receiving a selection for a corresponding one of the options from a user as an input while the actor performs the standby operation, providing a connection image after the receiving of the selection, providing a corresponding branched image according to the selection of the user after the providing of the connection image, performing computer graphic processing on at least a portion of the actor in the connection image, and allowing the actor to perform a connection operation so that a first posture of the actor at a time point at which the selection is received is smoothly connected to a second posture of the actor at a start time point of the branched image.

The actor in the idle image may move from the first standby posture to the second standby posture. The memory may store a plurality of connection images, wherein the plurality of connection images may include a first connection image including the actor moving from the first standby posture to the second posture and a second connection image including the actor moving from the second standby posture to the second posture. The memory may include instructions causing the processor to execute the operations of checking the first posture of the actor at the time point at which the selection is received, and selectively providing the first connection image or the second connection image according to the checked first posture.

The actor in the idle image may move from the first standby posture to the second standby posture and then return to the first standby posture from the second standby posture. Even when the posture of the actor in the idle image is more similar to the second standby posture than the first standby posture at the time point at which the processor receives the selection, the actor in the idle image returns to the first standby posture, and the memory may provide the connection image after the returning to the first standby posture. The connection image may include clothes in the first standby posture of the actor being dissolved into clothes in the second posture of the actor.

BRIEF DESCRIPTION OF THE DRAWINGS

The above and other aspects and features of the present disclosure will become more apparent by describing exemplary embodiments thereof in detail with reference to the attached drawings, in which.

DETAILED DESCRIPTION OF THE EMBODIMENTS

Figure 1:
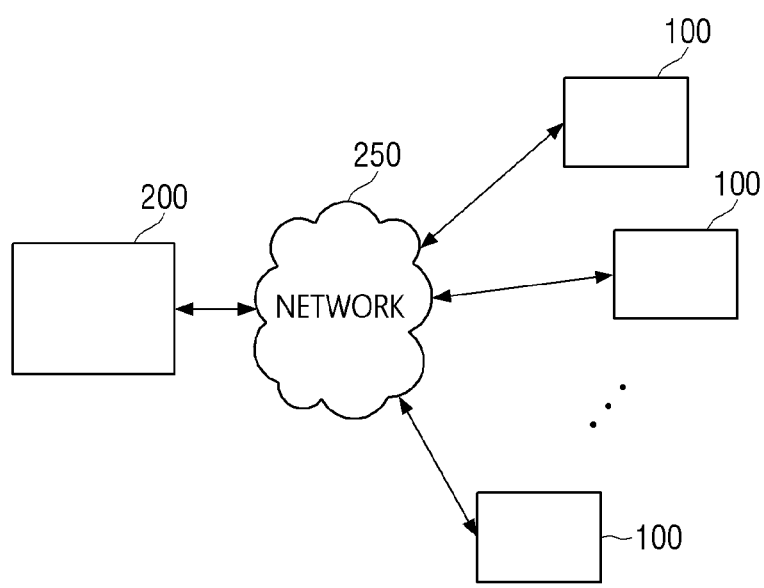
FIG. 1 is a conceptual diagram for describing a system for providing interactive virtual reality content according to some embodiments of the present disclosure.

Hereinafter, exemplary embodiments of the present disclosure will be described in detail with reference to the accompanying drawings. Advantages and features of the present disclosure and methods of achieving the same will be clearly understood with reference to the accompanying drawings and embodiments described in detail below. However, the present disclosure is not limited to the embodiments to be disclosed below, but may be implemented in various different forms. The embodiments are provided in order to fully explain the present embodiments and fully explain the scope of the present embodiments for those skilled in the art. The scope of the present embodiments is only defined by the appended claims.

Although the terms "first," "second," etc. are used herein to describe various elements, components, and/or sections, it should be understood that these elements, components, and/or sections are not limited by these terms. The terms are only used to distinguish one element, component, or section from another element, component, or section. Therefore, it should be understood that a first element, a first component, or a first section to be described below may be a second element, a second component, or a second section within the technical scope of the present disclosure.

Terms used in this specification are considered in a descriptive sense only and not for purposes of limitation. In this specification, the singular forms include the plural forms unless the context clearly indicates otherwise. It will be understood that the terms "comprise" and/or "comprising," when used herein, specify some stated components, steps, operations and/or elements, but do not preclude the presence or addition of one or more other components, steps, operations and/or elements.

Unless otherwise defined, all terms (including technical and scientific terms) used herein can be used as is customary in the art to which the present disclosure belongs. Also, it will be further understood that terms, such as those defined in commonly used dictionaries, will not be interpreted in an idealized or overly formal sense unless expressly so defined herein.

Hereinafter, embodiments of the present disclosure will be described in detail with reference to the accompanying drawings, and in the description with reference to the accompanying drawings, the same or corresponding components are denoted by the same reference numerals regardless of drawing number, and thus the description thereof will not be repeated.

In this specification, the expression "configured (or set) to" may be interchangeably used with, for example, the expression "suitable for," "having-capability," "changed to," "made to," "capable of," or "designed to" in hardware or software, according to the situation. In some situations, the expression "a device configured to" may mean that the device may operate together with other devices or parts. For example, the phrase "processor configured (or set) to perform A, B, and C" may refer to a general-purpose processor (e.g., an embedded processor) for performing corresponding operations, or may refer to a general-purpose processor (e.g., a central processing unit (CPU) or an application processor) capable of executing one or more software programs stored in a memory device to perform corresponding operations. In this specification, the term "user (or audience)" may refer to a person who uses an electronic device or a device (e.g., an artificial intelligence electronic device) that uses an electronic device.

Figure 2:
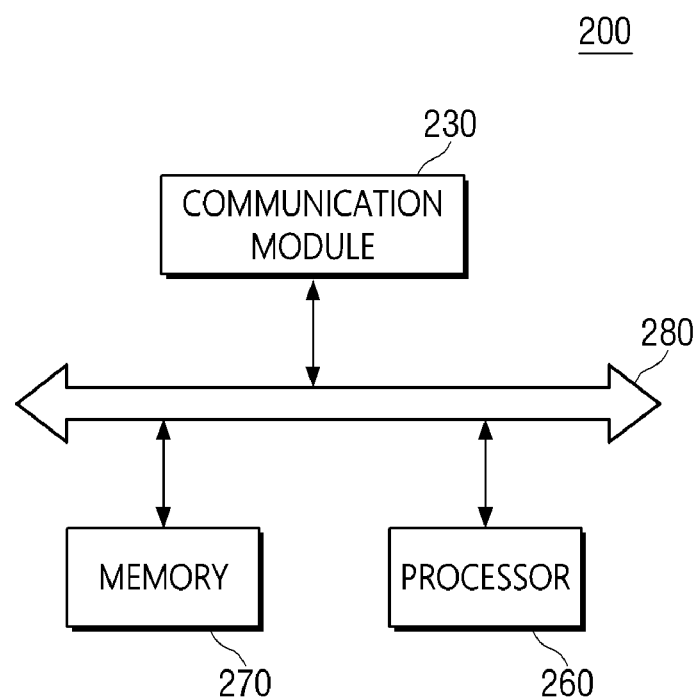
FIG. 2 is an exemplary block diagram for describing a configuration of a content providing device illustrated in FIG. 1.

FIG. 1 is a conceptual diagram for describing a system for providing interactive virtual reality content according to some embodiments of the present disclosure. FIG. 2 is an exemplary block diagram for describing a configuration of a content providing device illustrated in FIG. 1.

Referring to FIG. 1, in the system for providing the interactive virtual reality content according to some embodiments of the present disclosure, user devices 100 of users (i.e., audience) are connected to a content providing device 200 or the like through a network 250.

The network 250 includes, for example, networks in both wired and wireless communication schemes. In particular, the wireless communication may include, for example, cellular network communication using at least one of Long-Term Evolution (LTE), LTE Advanced (LTE-A), Code-Division Multiple Access (CDMA), Wideband CDMA (WCDMA), Universal Mobile Telecommunications System (UMTS), wireless broadband (WiBro), or Global System for Mobile Communications (GSM). Alternatively, the wireless communication may include, for example, at least one of WiFi, LiFi, Bluetooth, Bluetooth Low Energy (BLE), Zig-Bee, near field communication (NFC), magnetic secure transmission, radio frequency (RF), or body area network (BAN). The wired communication may include, for example, at least one of Universal Serial Bus (USB), high definition multimedia interface (HDMI), Recommended Standard 232 (RS-232), powerline communication, plain old telephone service (POTS), and a computer network (e.g., a local area network (LAN) or a wide area network (WAN)).

The content providing device 200 is a device for providing interactive virtual reality content which will be described below. For example, the content providing device 200 may be implemented with one or more servers, but the present disclosure is not limited thereto. For example, the content providing device 200 may be composed of a combination of various servers such as a database server, a file server, a mail server, a web server, and the like. The content providing device 200 may be implemented in the form of a centralized server or may be implemented in the form of a distributed server.

The user device 100 is a device used by the user (or audience) to view virtual reality content and may be, for example, a wearable device. Examples of the wearable device may include at least one of a head mounted display (HMD), an accessory device (e.g., a watch, a ring, a bracelet an anklet, a necklace, glasses, a contact lens, etc.), a fabric or clothing integrated device (e.g., electronic clothes), a body-attached device (e.g., a skin pad or tattoo), and a bio-implantable circuit. The user device 100 may be implemented in different forms and may include, for example, at least one of a smartphone, a tablet personal computer (PC), a personal digital assistant (PDA), a portable multimedia player (PMP), a medical device, a camera, and a wearable device.

The user (i.e., audience) may use the user device 100 to individually view virtual reality content in a personal place (e.g., home, office, etc.). Alternatively, the plurality of users may gather to view virtual reality content in a common place such as a cinema. When the users view the virtual reality content in the common place, the user devices 100 may be fixedly or detachably installed to seats. Alternatively, when the user devices 100 are not installed in the seats, the users (i.e., audience) may receive and use the user devices 100 from the theater or may bring and use separate personal electronic devices.

Here, referring to FIG. 2, in the content providing device 200, various components such as a communication module 230, a processor 260, a memory 270, an input and output interface, and the like may be connected to each other and may communicate with each other (i.e., control message transmission and data transmission) through a bus 280.

The communication module 230 is a module for communicating with other user devices 100, the content providing device 200, or the like through various wired and/or wireless networks 250 described in FIG. 1.

The term "module" used herein may include a unit composed of hardware, software, or firmware and may be used interchangeably with terms such as, for example, logic, a logic block, a part, or a circuit. The "module" may be an integrally configured component, a minimum unit that performs one or more functions, or a portion of the minimum unit. The "module" may be implemented mechanically or electronically.

The processor 260 may include one or more of a CPU, an application processor, and a communication processor. For example, the processor 260 may control at least one other component of the content providing device 200 and/or perform an operation or data processing related to communication.

The memory 270 may include a volatile memory (e.g., a dynamic random access memory (DRAM), a static random access memory (SRAM), or a synchronous dynamic random access memory (SDRAM) and/or a non-volatile memory (e.g., a one time programmable read-only memory (OTPROM), a programmable read-only memory (PROM), an erasable programmable read-only memory (EPROM), an electrically erasable programmable read-only memory (EEPROM), a mask read-only memory (ROM), a flash ROM, a flash memory, a phase-change random access memory (PRAM), a resistive random access memory (RRAM), a magnetic random access memory (MRAM), a hard drive, or a solid state drive (SSD)). The memory 270 may include an internal memory and/or an external memory. The memory 270 may store, for example, commands or data related to at least one other component of the content providing device 200. Further, the memory 270 may store software and/or programs. The programs may include, for example, a kernel, middleware, an application programming interface (API), and/or an application program (or application). At least a portion of the kernel, middleware, or API may be referred to as an operating system.

The memory 270 may store instructions for performing a method of screening the next interactive virtual reality content.

Specifically, the memory 270 includes instructions causing the processor 260 to execute the operations of providing an idle image including options, wherein an actor in the idle image performs a standby operation, receiving a selection for a corresponding one of options from the user as an input while the actor performs the standby operation, providing a connection image after the receiving of the selection, providing a corresponding branched image according to the selection of the user after the providing of the connection image, performing computer graphic processing on at least a portion of the actor in the connection image, and allowing the actor to perform a connection operation so that a first posture of the actor at a time point at which the selection is received is smoothly connected to a second posture of the actor at a start time point of the branched image.

Further, the actor in the idle image moves from a first standby posture to a second standby posture. The memory 270 stores a plurality of connection images, wherein the plurality of connection images include a first connection image including the actor moving from the first standby posture to the second posture and a second connection image including the actor moving from the second standby posture to the second posture. The memory 270 includes instructions causing the processor 260 to execute the operations of checking the first posture of the actor at the time point at which the selection is received and selectively providing the first connection image or the second connection image according to the checked first posture.

The actor in the idle image may move from the first standby posture to the second standby posture and then return from the second standby posture to the first standby posture. Even when the posture of the actor in the idle image is more similar to the second standby posture than the first standby posture at the time point at which the processor 260 receives the selection, the actor in the idle image returns to the first standby posture, and the memory 270 may provide the connection image after the returning to the first standby posture. The connection image may include clothes in the first standby posture of the actor being dissolved into clothes in the second posture of the actor.

Such a method of providing the interactive virtual reality content will be described below in detail with reference to FIGS. 3 to 13.

In this specification, what is expressed as "image" such as a previous image, an idle image, a connection image, a branched image, or the like refers to an image used in various types of virtual reality content such as movies, games, videos, and the like.

Figure 3:
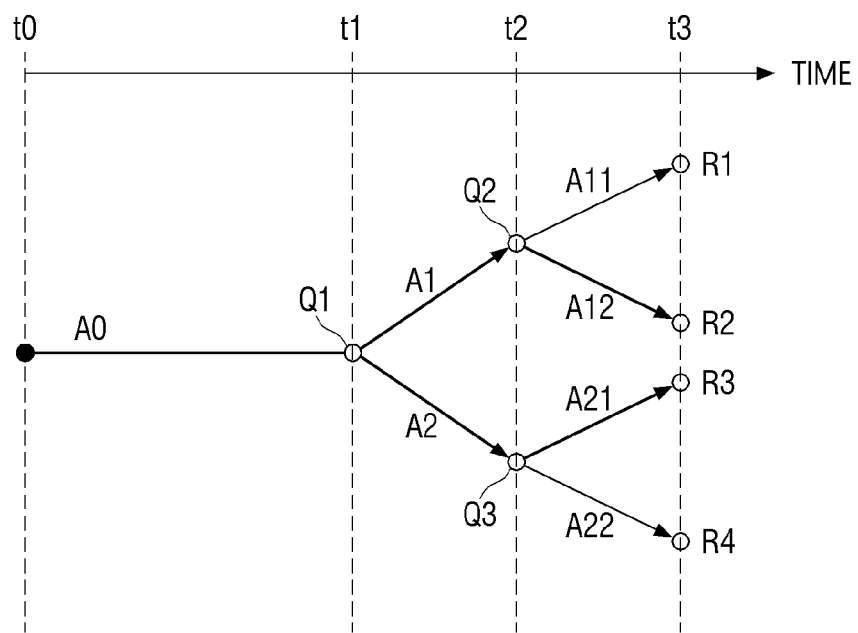
FIG. 3 is a diagram for describing a method of providing interactive virtual reality content according to some embodiments of the present disclosure.
Figure 4:
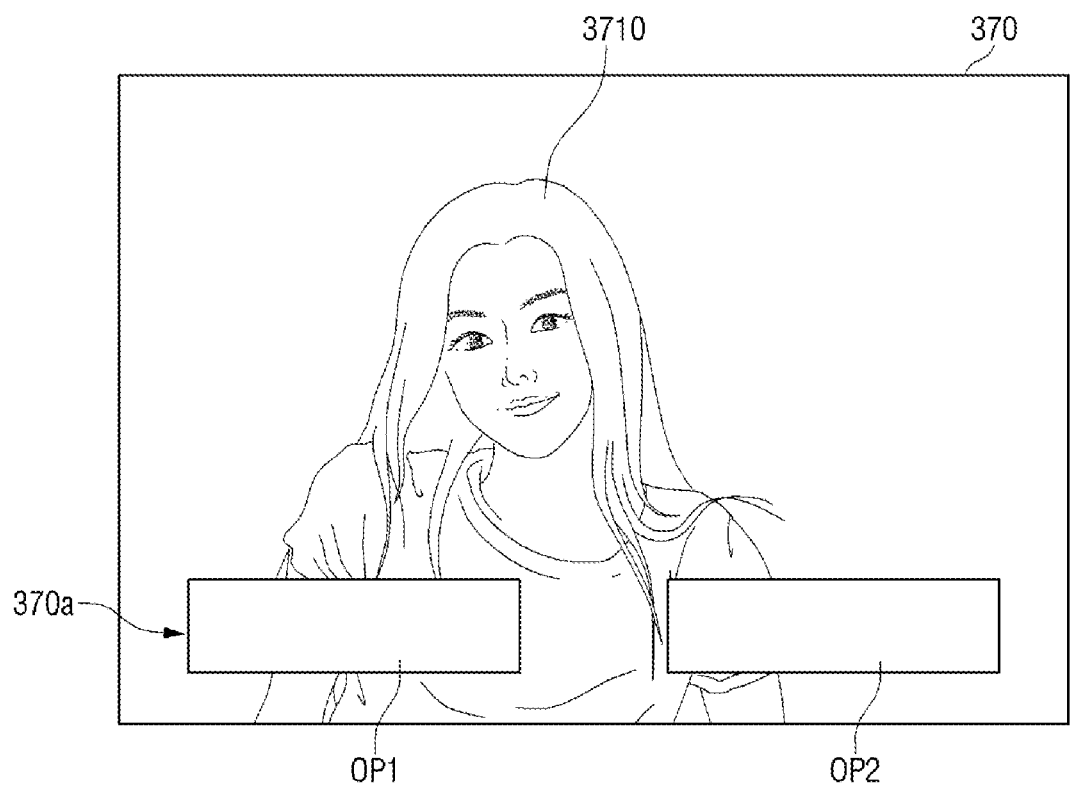
FIG. 4 is a diagram for describing an idle image in a method of providing interactive virtual reality content according to some embodiments of the present disclosure.

FIG. 3 is a diagram for describing a method of providing interactive virtual reality content according to some embodiments of the present disclosure. FIG. 4 is a diagram for describing that options appear at branching points of the interactive virtual reality content.

First referring to FIG. 3, in the method of providing the interactive virtual reality content according to some embodiments of the present disclosure, a previous image A0 is provided from a time t0 to a time t1. A user views the previous image A0 through a user device 100.

After the previous image A0 is provided, at least one option is provided at a first branching point Q1 (e.g., at the time t1).

Subsequently, a selection for a corresponding one of the options is received from the user (i.e., through the user device 100).

From the time t1 to a time t2, a corresponding branched image A1 or A2 is provided according to the selection of the user. The user views the branched image A1 or A2 through the user device 100.

Specifically, referring to FIG. 4, in the previous image A0, an actor 3710 ("Younghee") finds an old bridge while wandering through a remote island after a forced landing. In this case, options 370*a* appear. A first option OP1 may be "cross the bridge," and a second option OP2 may be "turn back without crossing the bridge." When the user selects the first option OP1, a branched image in which the actor 3710 crosses the bridge is displayed (i.e., the branched image A1 is provided). When the user selects the second option OP2, a branched image in which the actor 3710 turns back without crossing the bridge is displayed (i.e., the branched image A2 is provided).

Referring again to FIG. 3, subsequently, after the branched image A1 is provided, at least one option is again provided at a second branching point Q2 (e.g., at the time t2).

Then, a selection for a corresponding one of the options is received from the user (i.e., through the user device 100). Then, from the time t2 to a time t3, a corresponding branched image A11 or A12 is provided according to the selection of the user. The user views the branched image A11 or A12 through the user device 100.

Alternatively, after the branched image A2 is provided, at least one option is provided at a third branching point Q3 (e.g., at the time t2).

Then, a selection for a corresponding one of the options is received from the user (i.e., through the user device 100). Then, from the time t2 to the time t3, a corresponding branched image A21 or A22 is provided according to the selection of the user. The user views the branched image A21 or A22 through the user device 100.

Endings R1, R2, R3, and R4 of the interactive virtual reality content may be changed according to the above-described at least one user's selection.

In FIG. 3, the second branching point Q2 and the third branching point Q3 are illustrated as being positioned at the same time t2, but the present disclosure is not limited thereto. That is, the positions of the second branching point Q2 and the third branching point Q3 may be changed according to the lengths of the branched image A1 and the branched image A2.

Here, the idle image including the options, which is provided at the branching point (e.g., Q1), will be described in detail with reference to FIG. 5.

Figure 5:
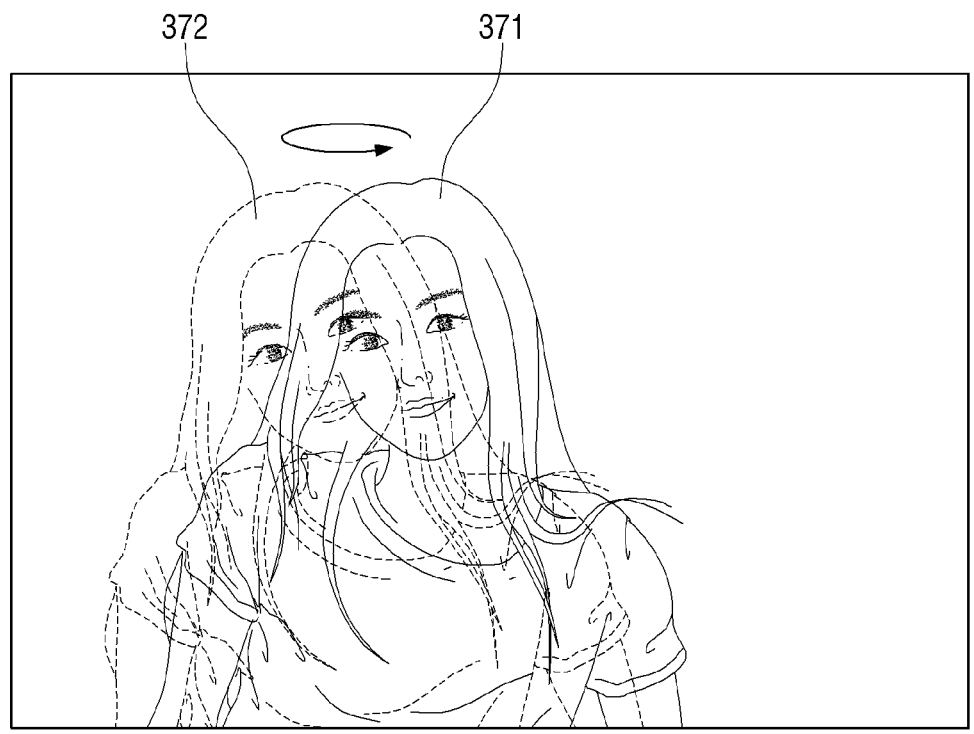
FIG. 5 is a diagram for describing an idle image in a method of providing interactive virtual reality content according to some embodiments of the present disclosure.

FIG. 5 is a diagram for describing the idle image in a method of providing the interactive virtual reality content according to some embodiments of the present disclosure. In order to describe in detail the movement of the actor in the idle image, the options 370*a* (see FIG. 4) are not illustrated.

As illustrated in FIG. 5, the actor in the idle image moves. In the interactive virtual reality content, when the actor remains stationary without moving while the user makes a selection (i.e., in the idle image), the immersion of the user may be lowered. For example, while the actor asks a question to the user and then waits for the user's answer (i.e., the selection), the actor should naturally move so that the immersion of the user may be increased.

For example, the actor in the idle image may move from a first standby posture 371 to a second standby posture 372. Further, the actor in the idle image may move from the first standby posture 371 to the second standby posture 372 and then return to the first standby posture 371 from the second standby posture 372. That is, the actor in the idle image may repeat a preset movement while waiting for the user's answer (i.e., the selection).

Meanwhile, in FIG. 5, the actor in the idle image is exemplified as moving and/or returning to the second standby posture 372 from the first standby posture 371, but the present disclosure is not limited thereto.

Although not separately illustrated, for example, the actor may move from the first standby posture 371 to the left to move to the second standby posture 372, may move from the second standby posture 372 to the right by passing through the first standby posture 371 and move to another standby posture and may move from the another standby posture to the left to return to the first standby posture 371.

Meanwhile, while the idle image is provided, a selection for a corresponding one of the options (e.g., 370*a*) is received from the user. In the method of providing the interactive virtual reality content according to some embodiments of the present disclosure, after the receiving of the selection, a connection image is provided. After the connection image is provided, a corresponding branched image is provided according to the selection of the user.

A connection image for connecting an idle image to a branched image will be described in detail with reference to FIGS. 6 to 9.

An actor in the idle image performs a standby operation, and it is assumed in the standby operation that the actor moves between the first standby posture 371 (see FIG. 5) and the second standby posture 372 (see FIG. 5). Further, it is assumed that the posture of the actor at the time point at which the selection is received from the user is a first posture 3911 (see FIG. 6) or 3912 (see FIG. 8) and the posture of the actor at the start time point of a branched image A1 is a second posture 381.

Figure 6:
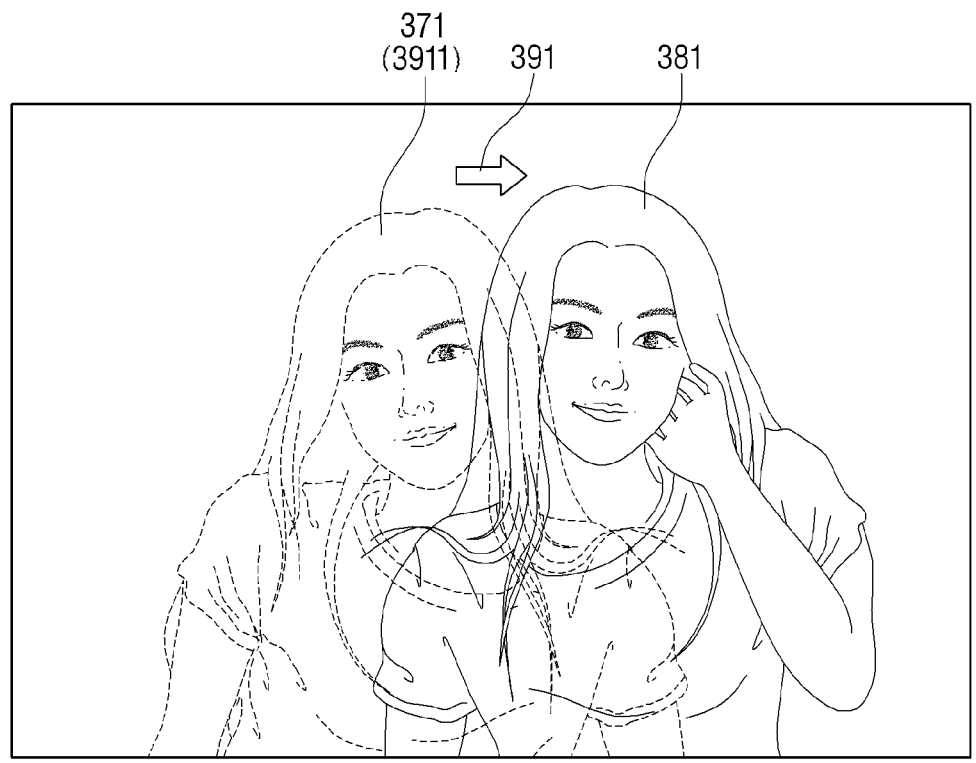
FIGS. 6 to 9 are diagrams for describing a connection image for connecting an idle image to a branched image in a method of providing interactive virtual reality content according to some embodiments of the present disclosure.
Figure 7:
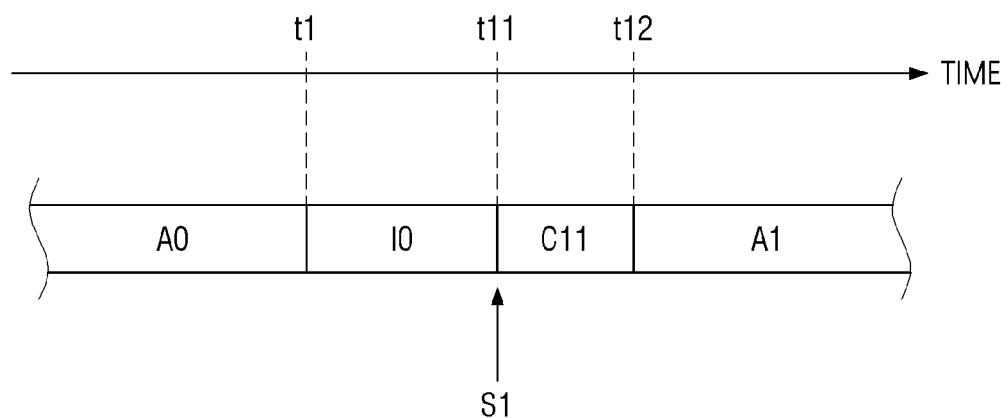

First, referring to FIGS. 6 and 7, before a time t1, a previous image A0 is provided.

From a time t1, an idle image I0 is provided. An actor in the idle image I0 performs a standby operation. That is, it is assumed that the actor in the idle image moves between the first standby posture 371 and the second standby posture 372.

At a time t11, while the idle image I0 is provided (i.e., while the actor performs the standby operation), a selection S1 of a corresponding one of options is received from a user. At the time point at which the selection is received from the user, the posture of the actor may correspond to a first standby posture 3711 or may be present in a posture more similar to the first standby posture 371 (than the second standby posture 372). That is, at the time point at which the selection is received from the user, the first posture 3911 of the actor may correspond to the first standby posture 371.

From the time t11 to a time t12, a first connection image C11 is provided. Specifically, the connection image may be changed according to the time point at which the selection S1 is received (or according to the posture of the actor at the time point at which the selection S1 is received). In FIGS. 6 and 7, since the first posture 3911 of the actor corresponds to the first standby posture 371, the first connection image C11 is provided.

The first connection image C11 smoothly connects the idle image I0 to the branched image A1 (which is provided from the time t12). Here, in the first connection image C11, the actor (in the idle image I0) moves from the first standby posture 371 to the second posture 381 at the start time point (of the branched image A1) (see 391 in FIG. 6).

Figure 8:
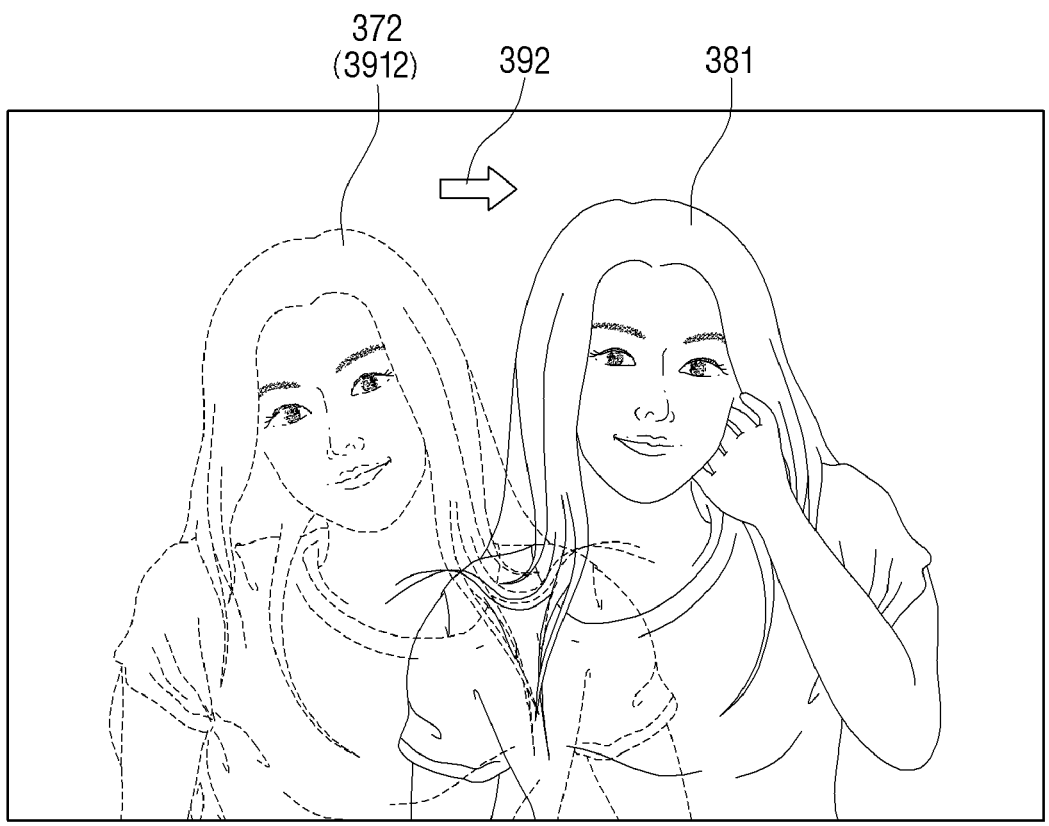
Figure 9:
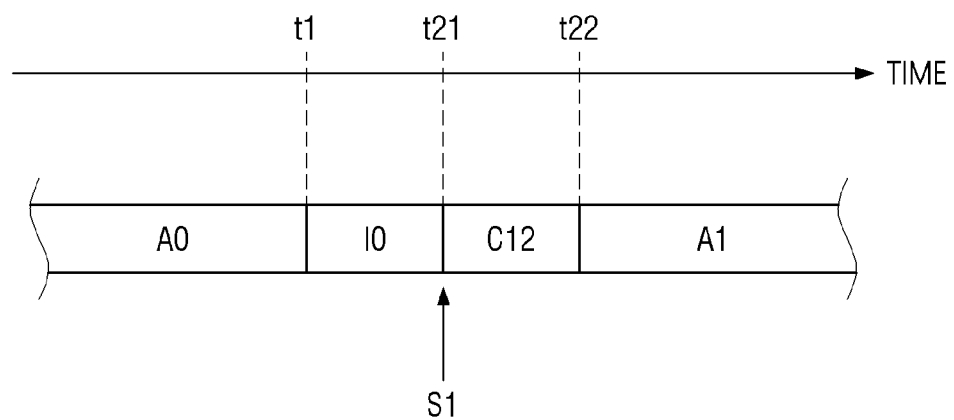

Referring to FIGS. 8 and 9, before a time t1, a previous image A0 is provided.

From the time t1, the idle image I0 is provided. An actor in the idle image I0 performs a standby operation. That is, it is assumed that the actor in the idle image moves between a first standby posture 371 and a second standby posture 372.

At a time t21, while the idle image I0 is provided (i.e., while the actor performs the standby operation), a selection S1 of a corresponding one of options is received from a user. At the time point at which the selection is received from the user, the posture of the actor may correspond to a second standby posture 372 or the actor may be present in a posture more similar to the second standby posture 372 (than the first standby posture 371). That is, at the time point at which the selection is received from the user, a first posture of the actor 3912 may correspond to the second standby posture 372.

From the time t21 to a time t22, a second connection image C12 is provided. Specifically, the connection image may be changed according to the time point at which the selection S1 is received (or according to the posture of the actor at the time point at which the selection S1 is received). In FIGS. 8 and 9, since the first posture of the actor 3912 corresponds to the second standby posture 372, the second connection image C12 is provided.

The second connection image C12 smoothly connects the idle image I0 to the branched image A1 (which is provided from the time t22). Here, in the second connection image C12, the actor (in the idle image) moves from the second standby posture 372 to the second posture 381 at the start time point (of the branched image A1) (see 392 in FIG. 8).

Referring to FIGS. 5 to 9, in the connection image C11 or C12, at least a portion of the actor is processed using computer graphics, and the actor performs the connection operation (see 391 in FIG. 6 or 392 in FIG. 8) so that the first posture 3911 or 3912 of the actor at the time point at which the selection S1 is received is smoothly connected to the second posture 381 of the actor at the start time point of the branched image A1.

Meanwhile, a plurality of connection images C11 and C12 may be prepared (e.g., the connection images may be stored in the memory 270 of FIG. 2). That is, since it is not known when the selection S1 will be received from the user during the process of providing the standby image, the plurality of connection images (e.g., C11 and C12) are stored for smooth connection to the branched image A1.

In FIGS. 5 to 9, the descriptions are given based on only two connection images C11 and C12, but the present disclosure is not limited thereto. That is, three or more connection images may be prepared. For example, a third standby posture may be present between the first standby posture 371 and the second standby posture 372. That is, the actor in the idle image may move from the first standby posture 371 to the second standby posture 372 by passing through the third standby posture and, conversely, may move from the second standby posture 372 to the first standby posture 371 by passing through the third standby posture. At the time point at which the selection is received from the user, the posture that is most similar to the posture of the actor is checked from among the first standby posture 371, the second standby posture 372, and the third standby posture. The first connection image C11 may be an image in which the actor moves from the first standby posture 371 to the second posture 381, the second connection image C12 may be an image in which the actor moves from the second standby posture 372 to the second posture 381, and the third connection image may be an image in which the actor moves from the third standby posture to the second posture 381. As a result of the check, at the time point at which the selection is received from the user, when it is checked that the posture of the actor is most similar to the third standby posture, the third connection image may be provided after the idle image I0.

While the idle image I0 is provided, when the selection S1 is received from the user and the image jumps directly to the branched image A1 without the connection image C11 or C12, there may be a large difference between the last scene (i.e., the posture of the actor at the time point at which the selection is received) of the idle image I0 and a scene (i.e., the posture of the actor at the start time point) at the start time point of the branched image A1. In this case, a degree of immersion of the user (i.e., audience) in the interactive virtual reality content is reduced.

On the other hand, while the idle image I0 is provided, even when the selection S1 is received from the user, when the user proceeds to the branched image A1 after viewing the idle image I0 to the end, the user may think that his or her selection S1 is not immediately reflected and that the actor's reaction is too slow. Even in this case, the degree of immersion of the user (i.e., audience) in the interactive virtual reality content is reduced.

Therefore, in the method of providing the interactive virtual reality content according to some embodiments of the present disclosure, while the idle image I0 is provided, when the selection S1 is received from the user, an immediate screen change is attempted (i.e., by providing the connection image C11 or C12), and thus the user may feel that his or her selection S1 is immediately reflected. Further, the connection image C11 or C12 smoothly connects the last scene (i.e., the posture of the actor at the time point at which the selection is received) of the idle image I0 to the scene (i.e., the posture of the actor at the start time point) at the start time point of the branched image A1, and thus a sense of awkwardness that occurs when the image jumps may be eliminated (see 391 in FIGS. 6 and 392 in FIG. 8).

Further, the method of producing the connection images C11 and C12 may be variously performed using computer graphic processing.

With a monochrome screen (e.g., a green screen or a blue screen) in the background, the actor performs the action of moving from the first standby posture 371 to the second posture 381 or performs the action of moving from the second standby posture 372 to the second posture 381 in advance. Using the above actions, the plurality of connection images C11 and C12 are produced.

Further, since the virtual reality content has a sense of depth unlike a general two-dimensional (2D) image, a sense of heterogeneity (awkwardness) occurs when the branched image A1 is directly connected to the idle image I0. For example, since clothes (wrinkles, flow, etc.) of the actor in the idle image I0 and clothes (wrinkles, flow, etc.) of the actor in the branched image A1 do not match, a sense of heterogeneity (awkwardness) occurs. Therefore, by performing computer graphic processing on the actor in the connection image C11 or C12, the idle image I0 is smoothly connected to the connection image C11 or C12 or the connection image C11 or C12 is smoothly connected to the branched image A1. In particular, the clothes (wrinkles, flow, etc.) of the actor in the connection image C11 or C12 smoothly matches the clothes of the actor in another image I0 or A1. In addition, the clothes (wrinkles, flow, etc.) of the actor in the connection image C11 or C12 may be dissolved into the clothes of the actor in another image (e.g., A1).

Hereinafter, a method of determining a connection image to be provided from among a plurality of prepared connection images will be described in detail with reference to FIGS. 10 to 12.

Figure 10:
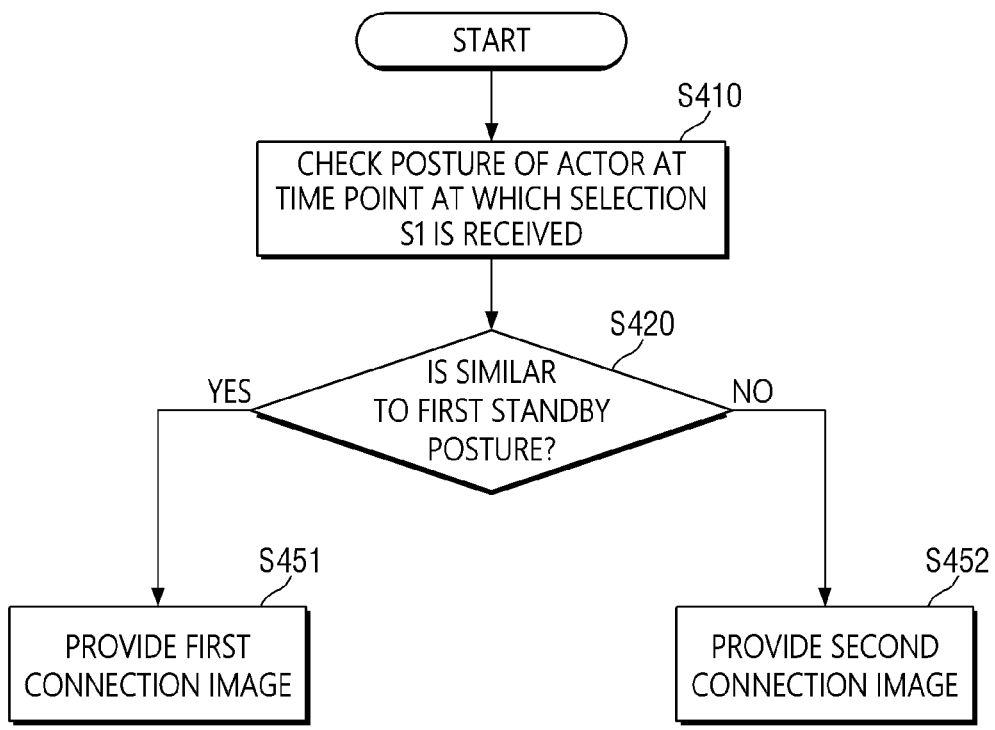
FIG. 10 is a flowchart for describing a method of providing interactive virtual reality content according to an embodiment of the present disclosure.

FIG. 10 is a flowchart for describing a method of providing interactive virtual reality content according to an embodiment of the present disclosure. For convenience of description, the contents which are substantially the same as those described with reference to FIGS. 4 to 9 will be omitted. In FIG. 10, when an actor in an idle image performs a standby operation, it is assumed in the standby operation that the actor moves between the first standby posture 371 (see FIG. 5) and the second standby posture 372 (see FIG. 5).

Referring to FIG. 10, after a previous image is provided, the idle image is provided. While the idle image is provided, a selection S1 of a corresponding one of options is received from a user. A posture of the actor (i.e., the first posture 3911 or 3912) at a time point at which the selection S1 is received is checked (S410). It is determined whether the posture of the actor at the time point at which the selection S1 is received is similar to the first standby posture 371 (S420).

Specifically, there may be various methods of checking the posture (i.e., a first posture) of the actor at the time point at which the selection S1 is received.

For example, by calculating the similarity between the first posture and the first standby posture 371 and the similarity between the first posture and the second standby posture 372 through image analysis, a standby posture that is more similar to the first posture may be determined from among the standby postures 371 and 372.

Alternatively, the standby posture is determined by comparing the standby posture to the first posture by using a first time stamp when the actor in the idle image is in the first standby posture 371, a time interval between the first standby posture 371 and the second standby posture 372, and a second time stamp at the time point at which the selection S1 is received. For example, the first time stamp is "1:10:10," and the time interval between the first standby posture 371 and the second standby posture 372 is 10 seconds. That is, the time when the actor is in the second standby posture 372 is expected to be "1:10:20." Here, when the second time stamp is "1:10:16," the time is closer to "1:10:20" than "1:10:10," and thus it is determined that the first posture is more similar to the second standby posture 372 than the first standby posture 371.

When the posture of the actor at the time point at which the selection S1 is received is similar to the first standby posture 371, a first connection image C11 is provided (S451).

When the posture of the actor at the time point at which the selection S1 is received is not similar to the first standby posture 371 (i.e., similar to the second standby posture 372), a second connection image C12 is provided (S452).

Figure 11:
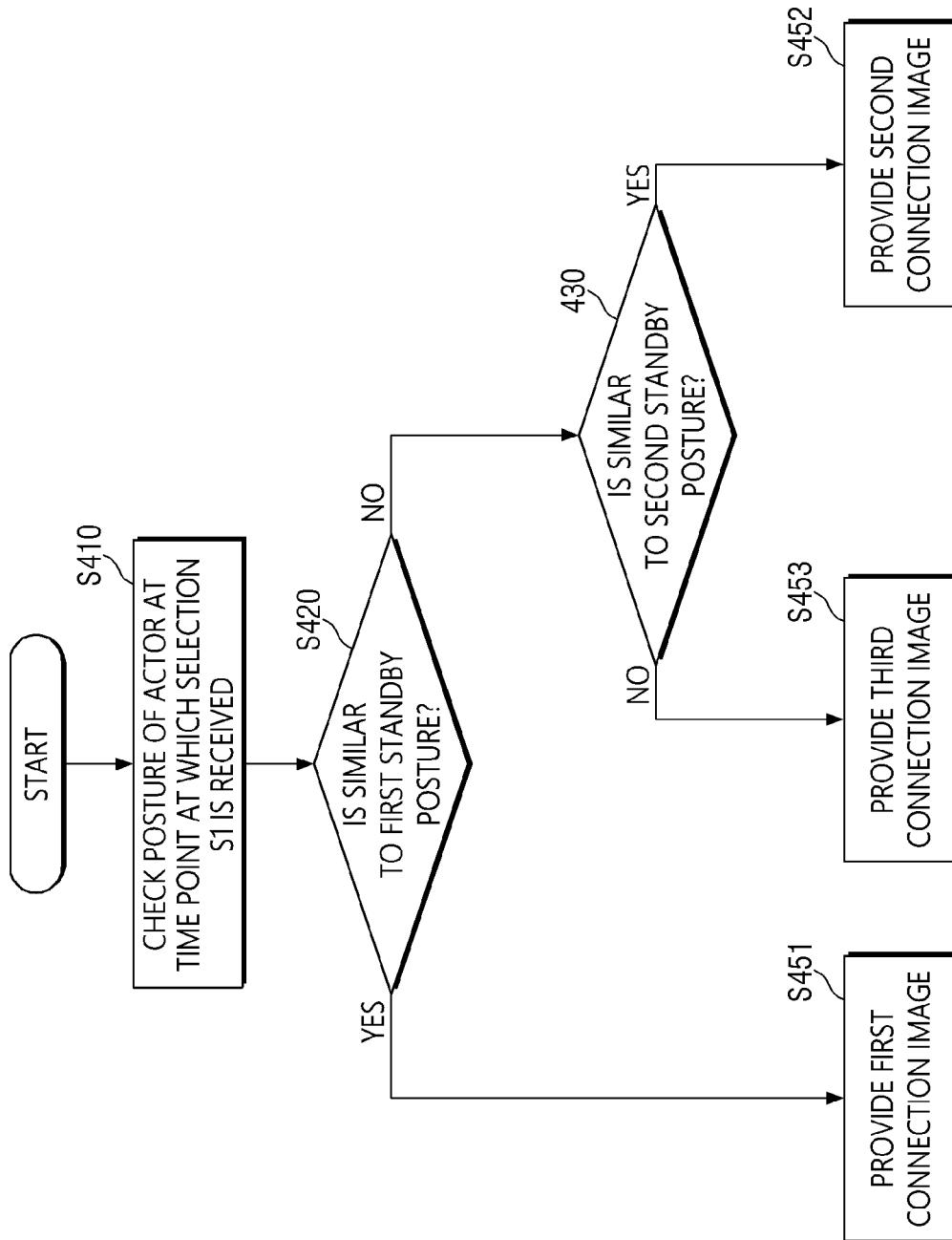
FIG. 11 is a flowchart for describing a method of providing interactive virtual reality content according to another embodiment of the present disclosure.

FIG. 11 is a flowchart for describing a method of providing interactive virtual reality content according to another embodiment of the present disclosure. For convenience of description, the contents which are substantially the same as those described with reference to FIGS. 4 to 10 will be omitted. In FIG. 11, a third standby posture may be present between a first standby posture 371 and a second standby posture 372. That is, an actor in an idle image may move from the first standby posture 371 (see FIG. 5) to the second standby posture 372 (see FIG. 5) by passing through the third standby posture and, conversely, may move from the second standby posture 372 to the first standby posture 371 by passing through the third standby posture.

Referring to FIG. 11, after a previous image is provided, the idle image is provided. While the idle image is provided, a selection S1 of a corresponding one of options is received from a user. A posture of the actor at a time point at which the selection S1 is received is checked (S410).

It is determined whether the posture of the actor at the time point at which the selection S1 is received is similar to the first standby posture 371 (S420).

When the posture of the actor at the time point at which the selection S1 is received is similar to the first standby posture 371, a first connection image C11 is provided (S451).

When the posture of the actor at the time point at which the selection S1 is received is not similar to the first standby posture 371, it is determined whether the posture of the actor at the time point at which the selection S1 is received is similar to the second standby posture 372 (S430).

When the posture of the actor at the time point at which the selection S1 is received is similar to the second standby posture 372, a second connection image C12 is provided (S452).

When the posture of the actor at the time point at which the selection S1 is received is not similar to the second standby posture 372 (i.e., similar to the third standby posture), a third connection image is provided (S453).

Figure 12:
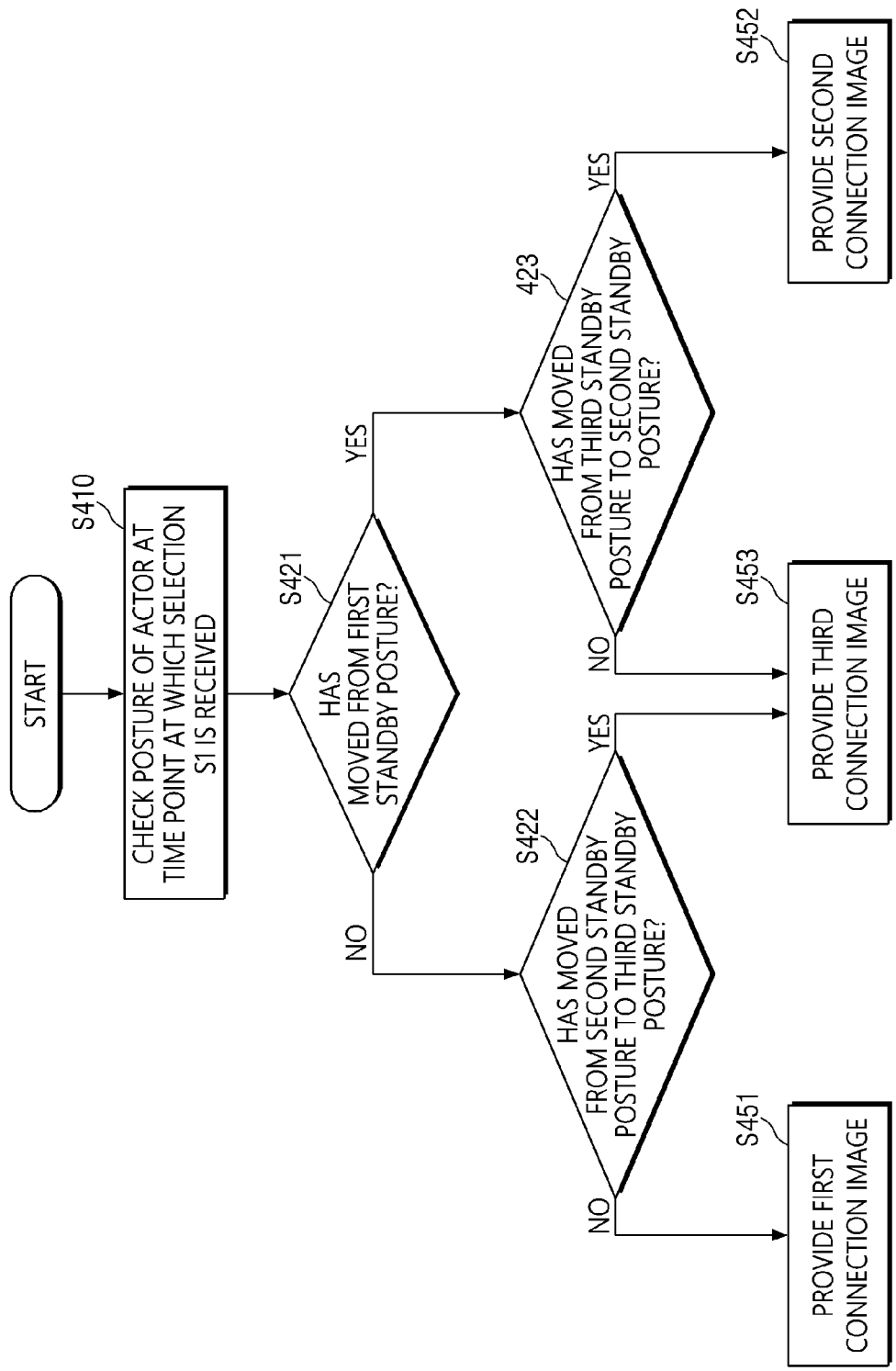
FIG. 12 is a flowchart for describing a method of providing interactive virtual reality content according to still another embodiment of the present disclosure.

FIG. 12 is a flowchart for describing a method of providing interactive virtual reality content according to still another embodiment of the present disclosure. For convenience of description, the contents which are substantially the same as those described with reference to FIGS. 4 to 11 will be omitted. In FIG. 12, an actor in an idle image may move from the first standby posture 371 (see FIG. 5) to the second standby posture 372 (see FIG. 5) by passing through the third standby posture and, conversely, may move from the second standby posture 372 to the first standby posture 371 by passing through the third standby posture.

Referring to FIG. 12, after a previous image is provided, the idle image is provided. While the idle image is provided, a selection S1 of a corresponding one of options is received from a user. A posture of the actor at a time point at which the selection S1 is received is checked (S410).

It is determined whether the posture of the actor at the time point at which the selection S1 is received moves from the first standby posture 371 (S421). The expression "YES" refers to moving from the first standby posture 371 toward the third standby posture and/or the second standby posture 372, and the expression "NO" refers to moving from the third standby posture and/or the second standby posture 372 toward the first standby posture 371.

Then, in the case of "YES" in operation S421, it is determined whether the posture of the actor moves from the third standby posture to the second standby posture 372 (S423).

In the case of "YES" in operation S423 (i.e., when moving from the third standby posture to the second standby posture 372), a second connection image C12 is provided (S452). That is, the second connection image C12 including the posture of the actor moving from the second standby posture 372 to the second posture 381 is provided.

In the case of "NO" in operation S423 (i.e., when moving from the first standby posture 371 to the third standby posture), a third connection image is provided (S453). That is, the third connection image including the posture of the actor moving from the third standby posture to the second posture 381 is provided.

Meanwhile, in the case of "NO" in operation S421, it is determined whether the posture of the actor moves from the second standby posture 372 to the third standby posture (S422).

In the case of "YES" in operation S422 (i.e., when moving from the second standby posture 372 to the third standby posture), the third connection image is provided (S453). That is, the third connection image including the posture of the actor moving from the third standby posture to the second posture 381 is provided.

In the case of "NO" in operation S422 (i.e., when moving from the third standby posture to the first standby posture 371), a first connection image C11 is provided (S451). That is, the first connection image C11 including the posture of the actor moving from the first standby posture 371 to the second posture 381 is provided.

The reasons for doing this are as follows. For example, while the actor moves from the first standby posture 371 to the third standby posture, the selection S1 is received. Even when the posture of the actor at the time point at which the selection S1 is received is more similar to the first standby posture 371, the first connection image C11 (i.e., moving from the first standby posture 371 to the second posture 381) is not provided and the third connection image (i.e., moving from the third standby posture to the second posture 381) is provided. In this way, the connection image (i.e., moving from the third standby posture to the second posture 381) is provided according to the moving direction of the actor (i.e., moving from the first standby posture 371 to the third standby posture), and thus the user may feel that the actor's reaction is natural.

Figure 13:
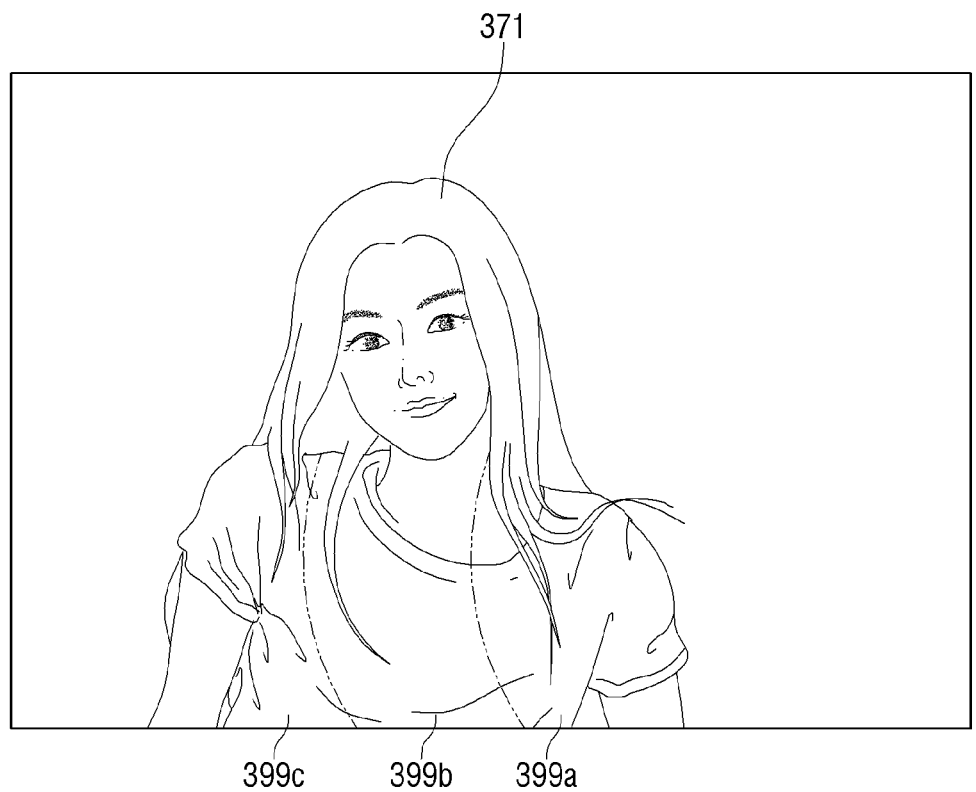
FIG. 13 is a diagram for describing a method of providing interactive virtual reality content according to yet another embodiment of the present disclosure.

FIG. 13 is a diagram for describing a method of providing interactive virtual reality content according to yet another embodiment of the present disclosure.

Referring to FIG. 13, an actor in an idle image repeats moving from a first standby posture 371 to a second standby posture 372 and then returning from the second standby posture 372 to the first standby posture 371.

Unlike what is described above, even when the posture of the actor in the idle image at the time point at which the selection S1 is received is more similar to the second standby posture 372 than the first standby posture 371, the actor in the idle image returns to the first standby posture 371. After the returning to the first standby posture 371, a first connection image C11 is provided (i.e., moving from the first standby posture 371 to the second posture 381).

Here, the first connection image C11 may further include clothes of the actor in the first standby posture 371 being dissolved into clothes of the actor in the second posture 381 by performing computer graphic processing. As described above, even when the clothes in the first standby posture 371 and the clothes in the second posture 381 are the same type of clothes, wrinkles, flows, etc. thereof may be different. Therefore, by making the flows, etc. the same, the connection to the branched image A1 may be made more natural.

In addition, in a start section of the branched image, characteristics of the movement of the actor may be further checked. A region to which the dissolve is first applied among the clothes of the actor in the first standby posture 371 may be changed according to the characteristics of the movement.

Specifically for example, in the start section of the branched image, the actor may move to the right. In this case, the dissolve may be applied first from a right portion of the clothes in the first standby posture 371. In FIG. 13, the dissolve may be applied in the order of a right portion 399a, an intermediate part 399b, and a left portion 399c. Generally, the user (e.g., the audience) pays more attention to the direction in which the actor moves. Therefore, when the dissolve is applied from the direction in which the actor moves, the user (e.g., the audience) may feel a more natural connection to the branched image A1.

Although the embodiments of the present disclosure have been described above with reference to the accompanying drawings, it should be understood by those skilled in the art that the present disclosure may be embodied in other specific forms without departing from the scope of the present disclosure and without changing essential features thereof. Therefore, the embodiments described above should be understood as only illustrative in all aspects and not for purposes of limitation.

What is claimed is:

1. A method of providing interactive virtual reality content performed by a computing device, the method comprising:

displaying option items, each of which shows information regarding a branched image to be displayed in response to a selection from a user, and displaying a standby operation of an actor of the virtual reality content, wherein the standby operation includes an idle image sequence in which a first image showing a first standby posture of the actor and a second image showing a second standby posture of the actor are repeatedly displayed;

while the actor is performing the standby operation, receiving, from the user, the selection for one option item from the options items;

after the receiving of the selection, checking a first posture of the actor at a time point at which the selection is received, identifying the branched image according to the selection, and checking a second posture of the actor at a start time point of the branched image;

according to the checked first posture of the actor, selecting one connection image from a first connection image showing the actor moving from the first standby posture to a second posture, and a second connection image showing the actor moving from the second standby posture to the second posture;

displaying the selected connection image so that the first posture of the actor at the time point at which the selection is received is smoothly connected to the second posture of the actor at the start time point of the branched image; and after the displaying the selected connection image, displaying the branched image.

2. The method of claim 1, wherein the checking of the first posture of the actor includes checking the first posture of the actor by using a first time stamp when the actor in the idle image is in the first standby posture, a time interval between the first standby posture and the second standby posture, and a second time stamp at the time point at which the selection is received.

3. The method of claim 1, wherein the information is text information describing the branched image.

4. The method of claim 1, wherein the actor is a virtual actor.

5. The method of claim 1, further comprising:

after the displaying the branched image, displaying another option items each of which shows information regarding another branched image to be displayed in response to another selection from the user, and displaying another standby operation of the actor of the virtual reality content, wherein the another standby operation includes another idle image sequence in which another first image showing another first standby posture of the actor and another second image showing another second standby posture of the actor are repeatedly displayed.

6. The method of claim 1, wherein all of the first image, the second image, the branched image, the first connection image, and the second connection image are pre-stored in a memory of the computing device.

7. A device for providing interactive virtual reality content, the device comprising:

a memory; and a processor, wherein the memory includes instructions causing the processor to execute operations of displaying option items, each of which shows information regarding a branched image to be displayed in response to a selection from a user, and displaying a standby operation of an actor of the virtual reality content, wherein the standby operation includes an idle image sequence, in which a first image showing a first standby posture of the actor and a second image showing a second standby posture of the actor are repeatedly displayed, receiving a selection for one option item from the option items from a user as an input while the actor is performing the standby operation, checking a first posture of the actor at a time point at which the selection is received, identifying a branched image according to the selection, checking a second posture of the actor at a start time point of the branched image, according to the checked first posture of the actor, selecting one connection image from a first connection image showing the actor moving from the first standby posture to a second posture, and a second connection image showing the actor moving from the second standby posture to the second posture, displaying the selected connection image so that the first posture of the actor at the time point at which the selection is received is smoothly connected to the second posture of the actor at the start time point of the branched image, and displaying the branched image.

8. The device of claim 7, wherein the information is text information describing the branched image.

9. The device of claim 7, wherein the actor is a virtual actor.

10. The device of claim 7, wherein the memory further includes instructions for, after the displaying the branched image, displaying another option items each of which shows information regarding another branched image to be displayed in response to another selection from the user, and displaying another standby operation of the actor of the virtual reality content, wherein the another standby operation includes another idle image sequence in which another first image showing another first standby posture of the actor and another second image showing another second standby posture of the actor are repeatedly displayed.

11. The device of claim 7, wherein all of the first image, the second image, the branched image, the first connection image, and the second connection image are pre-stored in the memory.

* * * * *